(12) United States Patent
Caviedes

(10) Patent No.: US 7,382,417 B2
(45) Date of Patent: Jun. 3, 2008

(54) METHOD AND ALGORITHM FOR DETECTION OF SCENE CUTS OR SIMILAR IMAGES IN VIDEO IMAGES

(75) Inventor: Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 11/021,779

(22) Filed: Dec. 23, 2004

(65) Prior Publication Data

US 2006/0139497 A1    Jun. 29, 2006

(51) Int. Cl.
*H04N 5/14* (2006.01)
(52) U.S. Cl. .................................... 348/700
(58) Field of Classification Search ................ 348/700, 348/701, 702, 699, 558, 459, 449, 441, 722
See application file for complete search history.

(56) References Cited

U.S. PATENT DOCUMENTS 5,734,419 A * 3/1998 Botsford et al. ............... 348/97
5,852,473 A * 12/1998 Horne et al. ................. 348/558
6,084,641 A * 7/2000 Wu ............................ 348/722
6,784,921 B2 * 8/2004 Lim ............................ 348/97
2002/0036717 A1   3/2002 Yukihiro et al.

FOREIGN PATENT DOCUMENTS

| EP | 0896 466 A2 | 2/1999 |
| EP | 1 251 689 A1 | 10/2002 |
| JP | 05 048995 | 2/1993 |
| JP | 05 236458 | 9/1993 |
| WO | WO 03/053073 | 6/2003 |

OTHER PUBLICATIONS

PCT International Search Report (dated May 2, 2006), International Application No. PCT/US2005/046992—International Filing Date Dec. 21, 2005 (11 pages).

* cited by examiner

*Primary Examiner*—M. Lee
(74) *Attorney, Agent, or Firm*—Trop, Pruner & Hu, P.C.

(57) ABSTRACT

A method for detecting scene cuts and similar pictures in a video sequence, including receiving pictures in a video sequence, extracting a set of features from two temporally consecutive pictures, computing a sum of square errors for the set of features with respect to the features of the previous picture, determining whether the error exceeds a predefined threshold and in response to the error exceeding the predefined threshold, detecting a scene change, and determining whether the error is less than a certain threshold thus detecting a similar picture has been found.

20 Claims, 4 Drawing Sheets

200

METHOD AND ALGORITHM FOR DETECTION OF SCENE CUTS OR SIMILAR IMAGES IN VIDEO IMAGES

BACKGROUND

Implementations of the claimed invention generally may relate to video processing and, more particularly, to detecting scene cuts.

In certain applications, video coding and processing takes advantage of similarity from one picture (frame or field) to the next in a video sequence (scene, or shot). For example, most objects remain the same, and small differences are due to motion. However, video coding and processing algorithms may break or degrade in the presence of scene changes or cuts. For example, in video coding, a new group of pictures (some of which are predicted from prior ones within the group) must be started if a scene changes. Video processing involving motion detection may not work if there is a fast, drastic change of scene and image content. A detection mechanism whose output may be used as a control signal for such algorithms is desirable.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
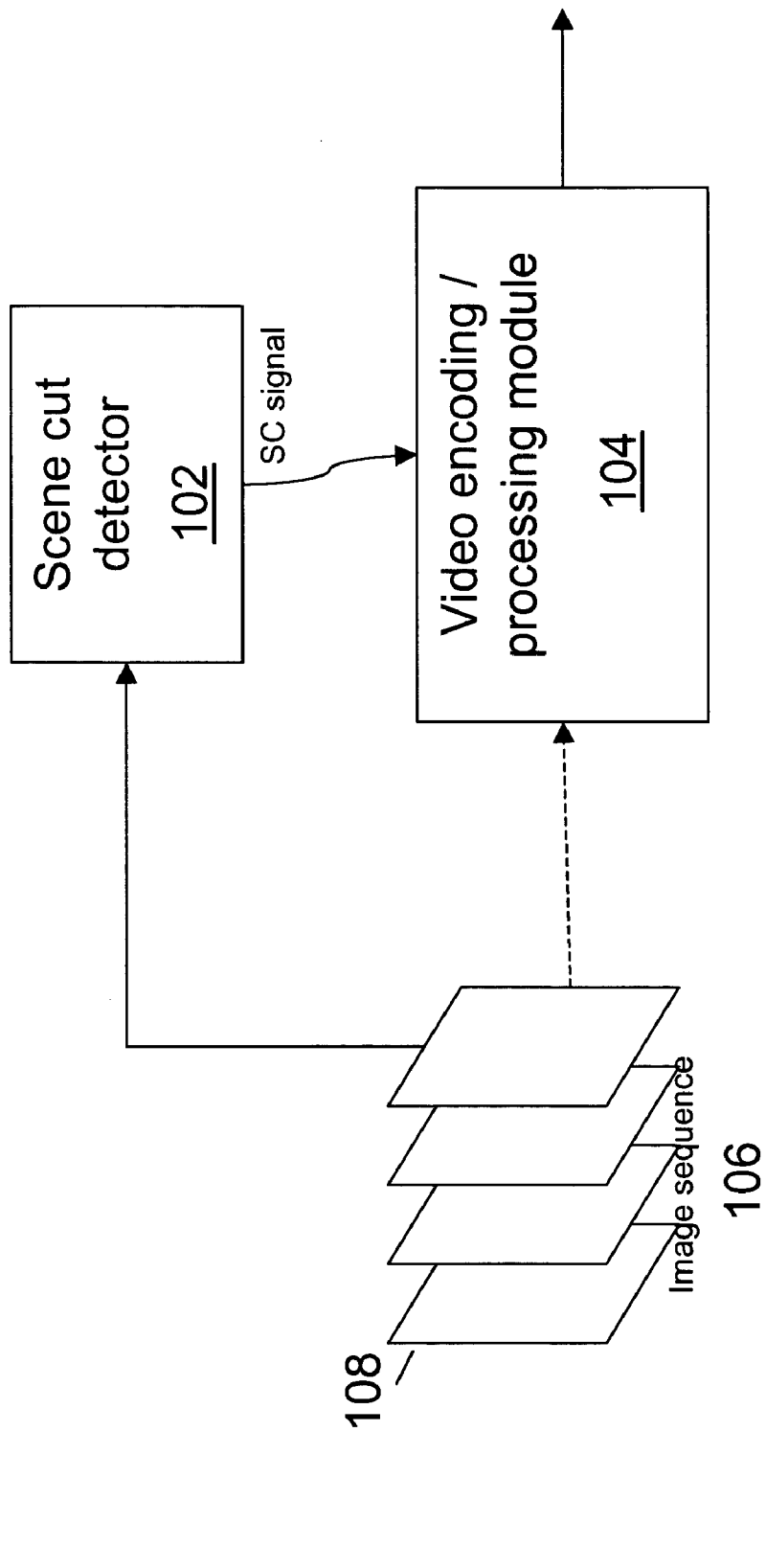
FIG. 1 illustrates an example block-based coding system incorporating a detector.

FIG. 1 illustrates an example block-based coding system 100 including detector 102 for detecting scene cuts or similar images, and video encoding/processing module 104. Input image sequence 104 is applied to video encoding/processing module 104. Input image sequence 104 may be a preprocessed image that has been partitioned into a plurality of blocks, such as block 108. The blocks are sequentially provided as an input to video encoding/processing module 104.

Block-based video coding systems, such as Moving Picture Experts Group (MPEG) standard of video coding (ISO/IEC international standards 13818-2, generally referred to as "MPEG-2"), take advantage of spatial and temporal redundancy within an image (intra-picture) and between images (inter-picture) within a sequence of images. For illustrative purposes, block-based coding system 100 discussed herein may be an MPEG-2 encoder. One skilled in the art will recognize that embodiments of the invention are not limited to implementation with a MPEG decoder. Rather, embodiments of the invention may be utilized to detect scene cuts in any applicable device, including but not limited to MPEG-2, and post-processing modules such as motion estimation and related functions (for example, scan rate conversion, motion compensated de-interlacing, motion-compensated noise reduction). Under the MPEG standard, blocks of pixels are commonly referred to as macroblocks, for example a 16×16 pixel block. One skilled in the art will recognize that the term macroblock is intended to describe a block of pixels of any size that is used for the basis of motion compensation.

Coding systems such as MPEG-2 take advantage of the redundancies in an input video sequence and efficiently code a video sequence into a transmittable bitstream. In particular, sequential pictures 108 within an input video sequence 106 typically contain similar information between frames, i.e., the imaged scene changes very little from picture to picture. After a scene change (scene cut), a substantial number of bits to code the first picture following the scene change is typically required. For example, in video coding, a new group of pictures (some of which are predicted from prior ones within the group) must be started if a scene changes. Video processing involving motion detection may not work if there is a fast, drastic change of scene and image content. Embodiments of the invention provide a detection mechanism whose output may be used as a control signal for such algorithms. One skilled in the art will recognize that embodiments of the invention are not limited to detecting scene cuts. Rather, the detector may be used in other applications as well, including detection of similar images. With respect to detection of similar images, in some instances frames are repeated in order to match the frame rate used by a display system. For example, if the original content was 25 frames per second and the display works at 50 frames per second, frames are repeated in order to match the display rate. If the frames have repetitions then it is important to detect them so that processing is not done twice on the same frame resulting in a more efficient process.

In that case, detecting the same frame is an important application. In one embodiment, it is determined whether the SAD or sum or square error is less than a threshold. The metric applies to frames or fields. In particular, sometime fields are repeated also to match display rates when video is interlaced, and the desired frame rate is not an integer multiple of the original (for example, converting film material from 24 fps to 30 fps).

Figure 2:
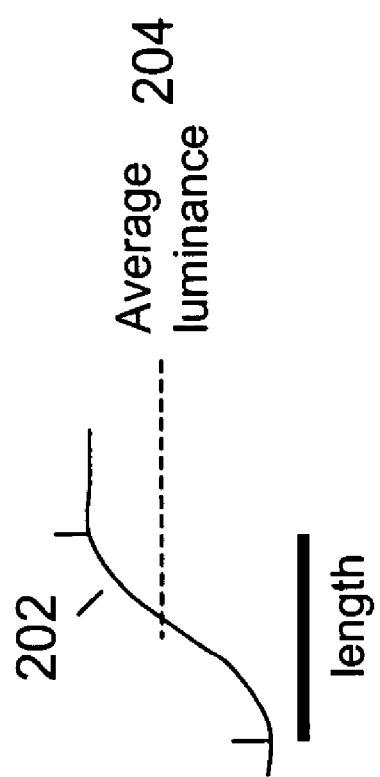
FIG. 2 illustrates an example graph of an average luminance along an edge.

Features are initially extracted from two temporally consecutive pictures (fields or frames). The previous image does not need to be stored, only the set of features. The features are related to luminance and edge information, but edge information may be computed using a simplified method called gradient runs. These features may include but are not limited to:

a. Average luminance—The average luminance of each picture is computed. The average luminance of each picture may be determined by subsampling all or a portion (for example, every other pixel) of the pixels in the image and calculating an average.

b. Average luminance at vertical edges—The average luminance at edges detected in the vertical direction of each frame is calculated. When a vertical edge is detected, the average luminance along that edge is detected to determine whether the whether the vertically detected picture edges are light or dark on average. For example, FIG. 2 illustrates an example graph 200 of an average luminance 204 along an edge 202. The vertical axis represents the pixel luminance and horizontal axis represents the length.

c. Average luminance at horizontal edges—The average luminance at edges detected in the horizontal direction of each frame is calculated as well.

d. Number of horizontal gradient runs (horizontal edges)—The number or approximate number of horizontal edges is determined. This value may be scaled for convenience.

e. Number of vertical gradient runs (vertical edges)—The number or approximate number of horizontal edges is determined. This value may be scaled for convenience.

f. Sum of run lengths of horizontal gradient runs—Horizontal gradient runs are approximations of the edges detected in the horizontal direction. The lengths of the horizontal gradient runs are added together. The length is the distance between the ends of a run. The sum of gradient run lengths is less or equal than the length of the line. This value may be scaled for convenience.

g. Sum of lengths of vertical gradient runs—The lengths of the vertical gradient runs are added together as well. This value may be scaled for convenience.

h. Minimum luminance (excluding 0 and 255)—The minimum luminance of the picture is determined.

i. Maximum Luminance (excluding 0 and 255)—The maximum luminance of the picture is determined. The minimum and maximum luminances provide the luminance range.

2. The sum of square errors for the above features—The sum of the square errors for the above features is determined. (In some cases, the sum of the absolute differences for the above features may be sufficient.) The sum of the square errors may be used to determine how different or similar one set of features is from the other set of features, and thus how different or similar are the pictures.

3. A thresholding operation such that if the square error is above a predefined value, then a change of scene has occurred If the difference exceeds a predefined value, a change of scene has occurred. A thresholding operation such that the square error is below a predefined value would indicate if the pictures are virtually identical. A difference of zero would be obtained in the ideal case, when there is no noise involved.

Figure 3:
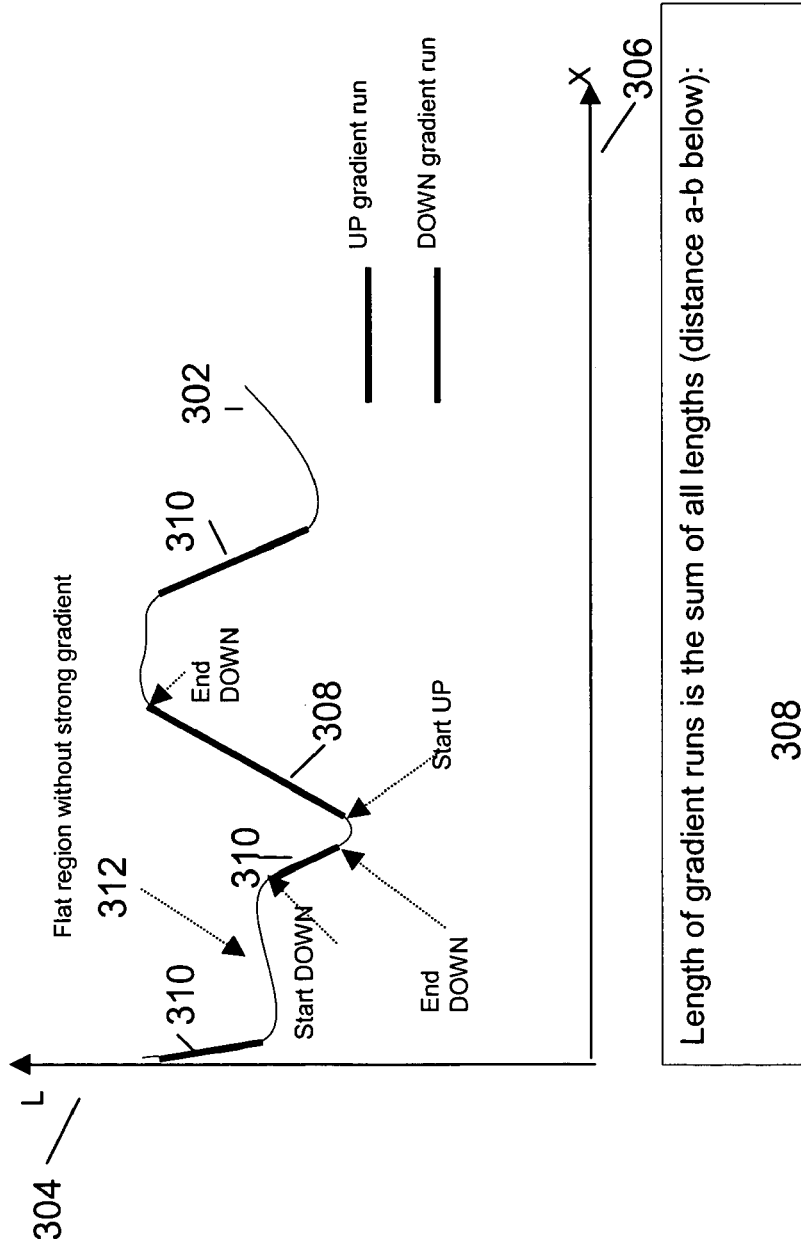
FIG. 3 illustrates an example graph of a gradient run function used by the detector of FIG. 1.

FIG. 3 illustrates an example graph 200 of a gradient run function used by the detector of FIG. 1. For edge-related features, gradient runs may be used to detect edges. Gradient runs are piecewise linear approximations of an edge contour. In particular, gradient runs are sets of pixels in a single direction which have the same gradient (or gradient in a certain range). To compute gradient runs, rows or columns in the image may be used. To avoid noise, a low pass filter, such as a Gaussian 1D filter, may be applied before computing the gradient runs. A gradient run may be a 5-tuple with the following elements (for a horizontal gradient run):

$$<X_1, X_2, y, Z_1, Z_2> = HR_y$$

$X_1$ is the coordinate of the start of the run, $X_2$ is the coordinate of the end of the run, y is the row index, and $Z_1/Z_2$ are the image values $f(X_1,y)/F(X_2,y)$.

The construction of gradient runs is essentially a piecewise linear approximation of the function $f$. Referring to FIG. 3, a profile of line 302 of an exemplary image including horizontal gradient runs associated with line 302 is shown. Horizontal gradient runs are edges detected in the horizontal direction. Vertical axis 304 represents the pixel luminance and horizontal axis 306 represents the length. In general, runs computed on picture lines may be referred to as horizontal runs and runs computed on picture columns may be referred to as vertical runs. Within horizontal/vertical runs may be up-runs and down-runs, such as up-runs 308 and down-runs 310. The length of the gradient runs is the sum of all lengths 308 and 310.

The straight lines are the runs, built from left to right. The elements of one of the runs are shown. For an edge to be considered, it preferably has a slope above a selected threshold. In particular, the run detection uses a threshold, thus, only edges steeper than a certain value are considered. For illustrative purposes, with a threshold of five, four runs are shown in the line. A flat region without strong gradient, such as illustrated by 312, is not considered. The average luminance of a run and over all runs combined with overall average, maximum, and minimum luminance are characteristic features of a picture. These features combined convey contrast information. Gradient runs may be up-runs or down-runs, the computation does not differentiate between the two but may in applications that require maximum reliability.

The number of runs is actually the number of edges, and the sum of run lengths (sum of $x_2-x_1$ for all runs) indicates the extent of the edges. These features are also relevant characteristics when comparing pictures in order to detect a change in scene. The actual process using gradient runs is shown as a flowchart in FIG. 4. The process may be implemented over an entire image, or a small region within, or even in one direction only (this works for scene cut detection, but for frame repetition a combination of horizontal and vertical features may be needed.

Figure 4:
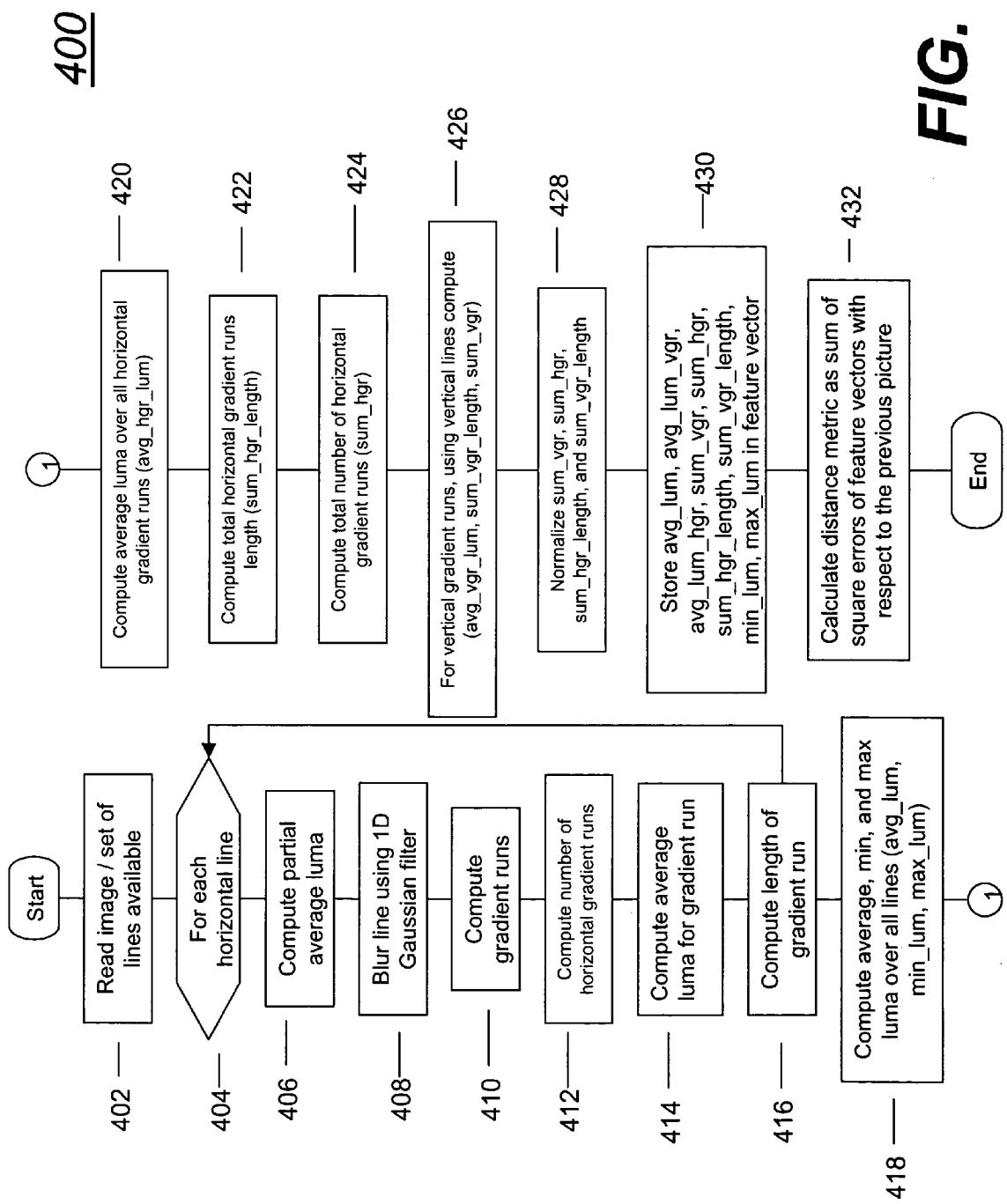
FIG. 4 is a flow chart illustrating a process of detecting a scene cut or similar image.

FIG. 4 is a flow chart illustrating a process of detecting a scene cut or similar image. Although FIG. 4 may be described with regard to system 100 for ease and clarity of explanation, it should be understood that process 400 may be performed by other systems than the specific system 100 illustrated in FIG. 1.

In act 402, the image is read. The image may be read in raster fashion.

In act 404, for each of the horizontal lines in the image, acts 406 through 416 are performed.

In act 406, the partial average luminance is computed. The luminance for each horizontal line is computed. The full luminance value will be known when the last line in the image is reached.

In act 408, the line is blurred using a filter. A filter, such as a 1D Gaussian filter, is used for such purpose, but it is not essential in all applications.

In act 410, gradient runs are computed.

In act 412, the number of horizontal gradient runs is computed.

In act 414, the average luminance for a gradient run is computed.

In act 416, the length of the gradient run is computed.

In act 418, the average, minimum and maximum luminance over all lines is computed.

In act 420, the average luminance over all the horizontal gradient runs is computed.

In act 422, the total horizontal gradient runs length is computed. For example, if one line has two edges, the lengths of the two gradient runs are computed and added to those of the next line and the next line and so forth.

In act 424, the total number of horizontal gradient runs is computed.

In act 426, for the vertical gradient runs, the vertical lines are used to compute the average luminance over all the vertical gradient runs, total vertical gradient runs length and total number of horizontal gradient runs. In a typical implementation, the image is scanned again to determine the characteristics associated with the vertical lines. Reading sections of the image and keeping track of accumulated values contribute to increasing efficiency in the calculation and avoiding reading the picture twice or using a large memory buffer (e.g. processing the image by tiles or stripes) One skilled in the art will recognize that either the horizontal or vertical values can be used to detect scene cuts. For example, only the horizontal values may be used. For additional precision, both the horizontal and vertical values may be used.

In act 428, the following values may be normalized: number of horizontal gradient runs, number of vertical gradient runs, sum of lengths of horizontal gradient runs, and sum of lengths of horizontal gradient runs.

In act 430, the values determined are stored in a feature vector.

In act 432, the distance metric may be calculated as sum of square errors of feature vectors with respect to the previous picture. After a set of features extracted from two temporally consecutive images (fields or frames) is determined, the sum of square errors for the above features. If the square error is above a certain threshold (such as 1000), a change of scene has occurred. In a typical implementation, the scene detector works in an off line mode, computing the feature set for each image read in, and computing the square error with respect to the features of the previous image (which may be stored in local memory). In some instances, a binary signal may be generated and sent to the modules that require it.

Embodiments of the invention are highly scalable. The complexity may be reduced with graceful degradation (only gradual loss in performance). For example, in order to reduce cost (or computational complexity), only the horizontal or only vertical runs may be used. For detection of similar images, a reduced combination of horizontal and vertical features may be used. Runs in one direction only (such as up-runs or down-runs) may be used for line processing. Additionally, embodiments of the invention may be only applied to portions of the image (a continuous portion or any other like a checkerboard pattern). For example, it may be applied to portions of the image (such as ½ or ⅓ of the image) rather than the entire image. Furthermore, a subset of the features may be used. For example, in some implementations, as few as three of the nine features to obtain a workable solution that is still cost effective may be used.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

Moreover, the acts in FIG. 4 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method for detecting scene cuts in a video sequence, comprising:
  receiving images in a video sequence;
  extracting a set of features from two temporally consecutive images, said features including a number of gradient runs at a selected direction;
  computing a sum of square errors for the set of features with respect to the features of the previous image;
  determining whether the sum of square errors exceeds a predefined threshold; and
  in response to the sum of square errors exceeding the predefined threshold, detecting a scene change.

2. The method claimed in claim 1, further comprising:
  generating a signal indicating scene change and sending it to a processing device.

3. The method claimed in claim 1, wherein extracting a set of features from two temporally consecutive images further comprises:
  extracting average luminance, average luminance at edges of a selected direction, number of gradient runs at the selected direction, sum of lengths of gradient runs at the selected direction, minimum luminance and maximum luminance.

4. The method claimed in claim 3, wherein extracting a set of features from two temporally consecutive images further comprises:
  extracting average luminance at edges of a second selected direction, number of gradient runs at the second selected direction, and sum of lengths of gradient runs at the second selected direction.

5. The method claimed in claim 1, wherein extracting a set of features from two temporally consecutive images further comprises:
  extracting a set of features from a portion of two temporally consecutive images.

6. The method claimed in claim 1, further comprising:
  storing the set of features extracted from two temporally consecutive images, rather than the image.

7. A method for detecting similar images in a video sequence, comprising:
  receiving images in a video sequence;
  determining a plurality of features from two temporally consecutive images, said features including an indication of a number of edges in a selected direction;

determining an error for the plurality of features with respect to the features of the previous image;

determining whether the error exceeds a predefined threshold; and in response to the error exceeding the predefined threshold, determining whether the images are similar.

8. The method claimed in claim 7, wherein determining an error for the plurality of features with respect to the features of the previous image further comprising:

determining the error as either a sum of square errors for the plurality of features with respect to the features of the previous image.

9. The method claimed in claim 1, wherein determining a plurality of features from two temporally consecutive images further comprises:

determining average luminance, average luminance at edges of a selected direction, number of gradient runs at the selected direction, sum of lengths of gradient runs at the selected direction, minimum luminance and maximum luminance.

10. The method claimed in claim 9, wherein determining a plurality of features from two temporally consecutive images further comprises:

determining average luminance at edges of a second selected direction, number of gradient runs at the second selected direction, and sum of lengths of gradient runs at the second selected direction.

11. The method claimed in claim 7, wherein determining a plurality of features from two temporally consecutive images further comprises:

determining a plurality of features from a portion of two temporally consecutive images.

12. The method claimed in claim 7, further comprising:

storing the set of features extracted from two temporally consecutive images, rather than the image.

13. An apparatus, comprising a controller for detecting similar images in a video sequence, including receiving images in a video sequence, determining a plurality of features from two temporally consecutive images, said features including an indication of a number of edges in a selected direction, determining an error for the plurality of features with respect to the features of the previous image, determining whether the error exceeds a predefined threshold, and in response to the error exceeding the predefined threshold, determining whether the images are similar.

14. A system, comprising a detector to receive images in a video sequence, determine a plurality of features from two temporally consecutive images, said features including an indication of a number of edges in a selected direction, determine an error for the plurality of features with respect to the features of the previous image, determine whether the error exceeds a predefined threshold, in response to the error exceeding the predefined threshold determine whether the images are similar and generate a signal indicating scene change; and a processing device for receiving the signal indicating a scene change.

15. A machine-accessible medium including instructions that, when executed, cause a machine to:

receive images in a video sequence;

determine a plurality of features from two temporally consecutive images, said features including a number of gradient runs at a selected direction;

determine an error for the plurality of features with respect to the features of the previous image;

determine whether the error exceeds a predefined threshold; and in response to the error exceeding the predefined threshold, determine whether the images are similar.

16. The machine-accessible medium claimed in claim 15, wherein instructions to determine an error for the plurality of features with respect to the features of the previous image further comprises instructions that, when executed, cause a machine to:

determine the error as either a sum of square errors for the plurality of features with respect to the features of the previous image.

17. The machine-accessible medium claimed in claim 16, wherein instructions to determine a plurality of features from two temporally consecutive images further comprises instructions that, when executed, cause a machine to:

determine average luminance, average luminance at edges of a selected direction, number of gradient runs at the selected direction, sum of lengths of gradient runs at the selected direction, minimum luminance and maximum luminance.

18. The machine-accessible medium claimed in claim 17, wherein instructions to determine a plurality of features from two temporally consecutive images further comprises instructions that, when executed, cause a machine to:

determine average luminance at edges of a second selected direction, number of gradient runs at the second selected direction, and sum of lengths of gradient runs at the second selected direction.

19. The machine-accessible medium claimed in claim 16, wherein instructions to determine a plurality of features from two temporally consecutive images further comprises instructions that, when executed, cause a machine to:

determine a plurality of features from a portion of two temporally consecutive images.

20. The machine-accessible medium claimed in claim 16, further comprising instructions that, when executed, cause a machine to:

store the set of features extracted from two temporally consecutive images, rather than the image.

* * * * *